(12) United States Patent
Zhang et al.

(10) Patent No.: US 12,556,561 B2
(45) Date of Patent: Feb. 17, 2026

(54) TRAFFIC DETECTION METHOD AND APPARATUS, DEVICE AND STORAGE MEDIUM

(71) Applicant: Beijing Volcano Engine Technology Co., Ltd., Beijing (CN)

(72) Inventors: Chen Zhang, Beijing (CN); Hui Luo, Beijing (CN); Jianxin Guo, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 124 days.

(21) Appl. No.: 18/573,252

(22) PCT Filed: Apr. 7, 2023

(86) PCT No.: PCT/CN2023/086763
§ 371 (c)(1),
(2) Date: Dec. 21, 2023

(87) PCT Pub. No.: WO2023/207548
PCT Pub. Date: Nov. 2, 2023

(65) Prior Publication Data
US 2024/0291840 A1 Aug. 29, 2024

(30) Foreign Application Priority Data
Apr. 29, 2022 (CN) .......................... 202210468301.1

(51) Int. Cl.
H04L 9/40 (2022.01)
G06N 20/00 (2019.01)

(52) U.S. Cl.
CPC ......... *H04L 63/1425* (2013.01); *G06N 20/00* (2019.01)

(58) Field of Classification Search
CPC ....................................................... G06N 20/00
See application file for complete search history.

(56) References Cited

U.S. PATENT DOCUMENTS

2015/0341380 A1 11/2015 Heo et al.
2016/0359740 A1 12/2016 Parandehgheibi et al.
(Continued)

FOREIGN PATENT DOCUMENTS

CN 102821002 A 12/2012
CN 108616498 A 10/2018
(Continued)

OTHER PUBLICATIONS

Extended European Search Report for European Patent Application No. 23794981.3, mailed on Oct. 23, 2024, 12 pages.

*Primary Examiner* — Barbara B Anyan
(74) *Attorney, Agent, or Firm* — Astute IP Law Group

(57) ABSTRACT

The present disclosure provides a traffic detection method, apparatus, device and storage medium. Network traffic can be obtained and parsed to obtain network state information related to the network traffic; according to the network state information, a target business container associated with the network traffic is searched, and a target traffic identification model corresponding to the target business container is invoked from a pre-trained traffic identification model set, and whether the network traffic is abnormal access network traffic is detected based on the invoked target traffic identification model; and the abnormal access network traffic is intercepted.

18 Claims, 7 Drawing Sheets

(56) References Cited

U.S. PATENT DOCUMENTS

| | | |
|---|---|---|
| 2018/0248905 A1 | 8/2018 | Davies et al. |
| 2019/0058722 A1 | 2/2019 | Levin et al. |
| 2019/0364067 A1 | 11/2019 | Yona et al. |
| 2020/0126037 A1* | 4/2020 | Tatituri .................. G06N 20/00 |
| 2021/0400021 A1 | 12/2021 | Barton et al. |
| 2022/0060491 A1 | 2/2022 | Achleitner et al. |

FOREIGN PATENT DOCUMENTS

| | | |
|---|---|---|
| CN | 109660517 A | 4/2019 |
| CN | 109714322 A | 5/2019 |
| CN | 109951500 A | 6/2019 |
| CN | 111813498 A | 10/2020 |
| CN | 113379469 A | 9/2021 |
| CN | 113746686 A | 12/2021 |
| CN | 113746692 A | 12/2021 |
| CN | 113949527 A | 1/2022 |
| CN | 114117429 A | 3/2022 |
| CN | 114666162 A | 6/2022 |
| TW | 202134962 A | 9/2021 |
| WO | 2015/074451 A1 | 5/2015 |

* cited by examiner

TRAFFIC DETECTION METHOD AND APPARATUS, DEVICE AND STORAGE MEDIUM

CROSS-REFERENCE TO RELATED APPLICATION

This is a national stage application based on International Patent Application No. PCT/CN2023/086763, filed Apr. 7, 2023, which claims priority to Chinese Patent Application No. 202210468301.1 filed to State Intellectual Property Office on Apr. 29, 2022 and entitled "Traffic Detection Method, Apparatus, Device and Storage Medium", the disclosures of which are incorporated herein by reference in their entireties.

TECHNICAL FIELD

The present disclosure relates to the field of Internet technology, and in particular to a traffic detection method, apparatus, device and storage medium.

BACKGROUND

Container network is an open network architecture, and general network defense schemes are mainly generic defense. For example, risky data packets are matched by predefined regular expressions, and a successful match indicates the existence of intrusion risk. This detection method needs to rely on network traffic analysis of historical attack manners to form relevant rules, so as to predefine the regular expressions for risk matching.

However, in the container environment, due to the characteristics of container micro-servicing, each container has a specific business meaning, and each container generally handles only network request related to single business. If the conventional unified security strategy is used, it may bring a lot of invalid filtering in the container environment, and it cannot identify the unknown risks.

In other words, the traditional way of detecting abnormal network traffic in the container environment has the problem of low detection accuracy and is prone to the cases of false negative or false positive.

SUMMARY

Embodiments of the present disclosure at least provide a traffic detection method, apparatus, device, and storage medium.

In a first aspect, an embodiment of the present disclosure provides a traffic detection method, comprising:
  obtaining network traffic and parsing the network traffic to obtain network state information related to the network traffic;
  searching, according to the network state information, a target business container associated with the network traffic, and invoking a target traffic identification model corresponding to the target business container from a pre-trained traffic identification model set, and detecting whether the network traffic is abnormal access network traffic based on the invoked target traffic identification model, in which the target traffic identification model is trained according to network traffic associated with the target business container;
  intercepting the network traffic in a case where the network traffic is detected as the abnormal access network traffic.

In an alternative embodiment, the network state information comprises Internet Protocol (IP) five-tuple information; the searching, according to the network state information, the target business container associated with the network traffic, and invoking the target traffic identification model corresponding to the target business container from the pre-trained traffic identification model set, comprises:
  determining a target business container group associated with the network traffic according to a source IP address and a destination IP address in the IP five-tuple information, wherein the target business container group comprises a source container matched with the source IP address and a destination container matched with the destination IP address;
  obtaining the target traffic identification model corresponding to the target business container group from the pre-trained traffic identification model set.

In an alternative embodiment, traffic identification models in the traffic identification model set are trained according to the following steps:
  performing, according to business information corresponding to the obtained network traffic and business information of one or a plurality of business containers, an aggregation process on the obtained network traffic to obtain a network traffic set corresponding to a business container group, wherein business information of business containers comprised in each business container group is the same;
  performing feature extraction of a plurality of feature dimensions on the network traffic set to obtain a feature matrix corresponding to the network traffic set, wherein the feature matrix is formed of feature vectors corresponding to network traffic comprised in the network traffic set;
  calculating, based on the feature matrix, to obtain a traffic identification model corresponding to the business container group, wherein the traffic identification model is used to characterize an aggregation feature corresponding to normal access network traffic.

In an alternative embodiment, after the target traffic identification model corresponding to the target traffic container is determined, the method further comprises:
  obtaining network traffic generated within a preset time period;
  re-executing, based on the network traffic generated within the preset time period, a training process of the target traffic identification model, to update the target traffic identification model.

In an alternative embodiment, the performing feature extraction of the plurality of feature dimensions on the network traffic set to obtain the feature matrix corresponding to the network traffic set comprises:
  performing feature extraction on a uniform resource locator (URL) address and a request body (Body) parameter in the network traffic set, respectively, to obtain a URL feature set and a Body parameter feature set comprised in the feature matrix;
  the calculating, based on the feature matrix, to obtain the traffic identification model corresponding to the business container group, comprises:
  calculating, based on the Body parameter feature set, a confidence interval of the Body parameter of the network traffic set in each feature dimension;
  adopting the URL feature set of the network traffic set and the confidence interval of the Body parameter in each feature dimension to form the traffic identification model.

In an alternative embodiment, the performing feature extraction on the request body (Body) parameter in the network traffic set comprises:

extracting, for each network traffic in the network traffic set, features of the Body parameter of the network traffic in a plurality of character-related dimensions;

obtaining, based on the features of Body parameters of the network traffic comprised in the network traffic set in the plurality of character-related dimensions, the Body parameter feature set corresponding to the network traffic set.

In an alternative embodiment, the detecting whether the network traffic is the abnormal access network traffic based on the invoked target traffic identification model comprises:

performing feature extraction on a uniform resource locator (URL) address and a request body (Body) parameter in the network traffic, respectively, to obtain a URL feature comprised in a feature vector of the network traffic and parameter features of the Body parameter in a plurality of feature dimensions;

determining whether the network traffic is the abnormal access network traffic based on the extracted feature vector, as well as the URL feature set indicated in the target traffic identification model and the confidence interval of the Body parameter in each feature dimension.

In an alternative embodiment, the determining whether the network traffic is the abnormal access network traffic based on the extracted feature vector, as well as the URL feature set indicated in the target traffic identification model and the confidence interval of the Body parameter in each feature dimension, comprises:

determining whether the URL feature of the network traffic belongs to the URL feature set and whether the parameter feature of the Body parameter in each feature dimension belongs to the confidence interval based on the URL feature of the network traffic indicated by the feature vector and the parameter features of the Body parameter of the network traffic in the plurality of feature dimensions;

determining an abnormal probability corresponding to the network traffic according to a determination result and weight values respectively corresponding to the URL feature and each feature dimension of and the Body parameter;

determining that the network traffic is the abnormal access network traffic in a case where the abnormal probability is greater than a set threshold, otherwise determining that the network traffic is a normal access network traffic.

In a second aspect, an embodiment of the present disclosure provides a traffic detection apparatus, comprising:

a data obtaining module, configured to obtain network traffic and parse the network traffic to obtain network state information related to the network traffic;

a traffic detecting module, configured to search, according to the network state information, a target business container associated with the network traffic, and invoke a target traffic identification model corresponding to the target business container from a pre-trained traffic identification model set, and detect whether the network traffic is abnormal access network traffic based on the invoked target traffic identification model, wherein the target traffic identification model is trained according to network traffic associated with the target business container;

a traffic intercepting module, configured to intercept the network traffic in a case where the network traffic is detected as the abnormal access network traffic.

In a third aspect, an embodiment of the present disclosure provides an electronic device, comprising: a processor, a memory and a bus, wherein the memory stores machine-readable instructions executable by the processor, the processor communicates with the memory through the bus when the electronic device runs, and when the machine-readable instructions are executed by the processor, steps of the traffic detection method according to any one of claims 1-9 are executed.

In a fourth aspect, an embodiment of the present disclosure provides a computer-readable storage medium, wherein a computer program is stored on the computer-readable storage medium, and when the computer program is run by a processor, steps of the traffic detection method in the above first aspect, or any possible in the first aspect are executed.

For description of the effects of the above-mentioned traffic detection apparatus, electronic device and computer-readable storage medium, reference can be made to the description of the above-mentioned traffic detection method, and will not be repeated here.

The traffic detection method provided by the embodiment of the present disclosure can obtain network traffic and parse the network traffic to obtain network state information related to the network traffic; search, according to the network state information, a target business container associated with the network traffic, and invoke a target traffic identification model corresponding to the target business container from a pre-trained traffic identification model set, and detect whether the network traffic is abnormal access network traffic based on the called target traffic identification model, wherein the target traffic identification model is trained according to network traffic associated with the target business container; and intercept the network traffic in a case where the network traffic is detected as the abnormal access network traffic.

In this way, in the embodiment of the present disclosure, firstly, for the business container of each business form, a traffic identification model matched with the business container is trained based on the network traffic corresponding to the business information of the business container; when performing network traffic detection, the business container associated with the network traffic can be searched, the target traffic identification model corresponding to the business container is invoked from the pre-trained traffic identification model set, and the network traffic is detected through the called target traffic identification model. In the embodiment of the present disclosure, traffic detection can be performed on business containers of different business meanings by using different traffic identification models, and network traffic detection adapted to the business feature of the business container is performed for the network traffic of each business container. Compared with the conventional unified detection strategy, risk identification and filtering can be performed more accurately, thereby reducing the cases of false negative or false positive of abnormal traffic.

On this basis, it can intercept the accurately identified abnormal access network traffic, thus improving access security, avoiding unnecessary interception and ensuring normal network access in the container environment.

In order to make the above objectives, features, and advantages of the present disclosure more obvious and understandable, some preferable embodiments will be enumerated and described in detail below with reference to the accompanying drawings.

BRIEF DESCRIPTION OF DRAWINGS

In order to more clearly illustrate the technical solutions of embodiments of the present disclosure, the accompanying drawings that need to be used in the embodiments are briefly described below, and the drawings herein are incorporated in and constitute a part of this specification, and these drawings illustrate some embodiments according to the present disclosure, and together with the description, serve to explain the technical solutions of the present disclosure. It should be understood that the following drawings illustrate only certain embodiments of the present disclosure, and therefore should not be considered as limiting the scope of the present disclosure, and for those skilled in the art, other related drawings may be obtained according to these drawings without involving any inventive effort.

DETAILED DESCRIPTION

Figure 1:
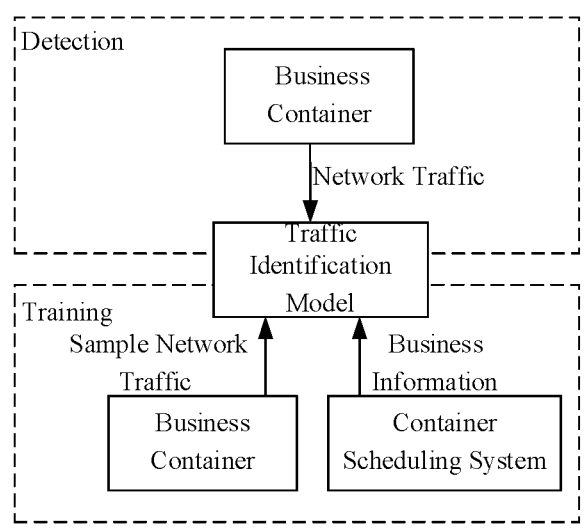
FIG. 1 is a schematic diagram of an application scenario provided by an embodiment of the present disclosure.

In order to make the objectives, technical solutions and advantages of the embodiments of the present disclosure more obvious, the technical solutions in the embodiments of the present disclosure will be clearly and completely described below in conjunction with the drawings in the embodiments of the present disclosure. Apparently, the described embodiments are only a part of the embodiments of the present disclosure, instead of all the embodiments. Generally, the components of embodiments of the present disclosure described and illustrated herein may be arranged and designed in a variety of different configurations. Therefore, the following detailed description of embodiments of the present disclosure is not intended to limit the scope of the present disclosure as claimed, but merely represents selected embodiments of the present disclosure. All other embodiments that can be obtained by those skilled in the art without creative efforts based on the embodiments of the present disclosure shall fall within the protection scope of the present disclosure.

It should be noted that like numerals and letters denote similar items in the following figures, therefore, once an item is defined in one figure, it does not require further definition and explanation in subsequent figures.

The term "and/or" herein only describes an association relationship, which means that there can be three kinds of relationships; for example, A and/or B can mean: only A exists, both A and B exist, and only B exists. In addition, the term "at least one" herein means any one or any combination of at least two of a variety, and for example, including at least one of A, B, and C, may mean including any one or more elements selected from a set consisting of A, B and C.

In research, it is found that the conventional access detection method is to use a unified security strategy, that is, to use the same detection method to perform traffic detection on business access in all container environments. However, due to the characteristics of container micro-servicing, each container has a specific business meaning, and each container generally handles only network request related to single business. Therefore, using the same detection method for diversified business may bring a lot of invalid filtering, and unknown risks may be difficult to identify, resulting in the inability to perform targeted detection for the business characteristics of each container, and further resulting in low detection accuracy of abnormal network traffic in the container environment. It is prone to the cases of false negative or false positive, and it is difficult to ensure the normal network access in the container environment.

Based on the above research, the present disclosure provides a traffic detection method, which can obtain network traffic and parse the network traffic to obtain network state information related to the network traffic; search, according to the network state information, a target business container associated with the network traffic, and invoke a target traffic identification model corresponding to the target business container from a pre-trained traffic identification model set, and detect whether the network traffic is abnormal access network traffic based on the invoked target traffic identification model, wherein the target traffic identification model is trained according to network traffic associated with the target business container; and intercept the network traffic in a case where the network traffic is detected as the abnormal access network traffic.

In this way, in the embodiment of the present disclosure, firstly, for the business container of each business form, a traffic identification model matched with the business container is trained based on the network traffic corresponding to the business information of the business container; when performing network traffic detection, the business container associated with the network traffic can be searched, the target traffic identification model corresponding to the business container is invoked from the pre-trained traffic identification model set, and the network traffic is detected through the invoked target traffic identification model. In the embodiment of the present disclosure, traffic detection can be performed on business containers of different business meanings by using different traffic identification models, and network traffic detection adapted to the business feature of the business container is performed for the network traffic of each business container. Compared with the conventional unified detection strategy, risk identification and filtering can be performed more accurately, thereby reducing the cases of false negative or false positive of abnormal traffic.

On this basis, it can intercept the accurately identified abnormal access network traffic, thus improving access security, avoiding unnecessary interception and ensuring normal network access in the container environment.

In order to facilitate the understanding of the embodiments of the present disclosure, firstly, a traffic detection method disclosed in an embodiment of the present disclosure is described in detail. An executive subject of the traffic detection method provided in the embodiment of the present disclosure is generally a computing device having certain computing capability, and the computing device includes, for example, a terminal device or server or any other processing device. In some possible implementations, the traffic detection method can be realized by invoking, by a processor, computer-readable instructions stored in a memory.

Hereinafter, the traffic detection method provided by the embodiment of the present disclosure will be described.

Referring to FIG. 1, it is a schematic diagram of an application scenario provided by an embodiment of the present disclosure. As shown in FIG. 1, in order to train a traffic identification model, the traffic identification model can be obtained by training based on the business information of each business container sent by the container scheduling system, as well as the sample network traffic and business information corresponding thereto. In terms of the trained traffic identification model, the business container can send the network traffic to be detected to the traffic identification model, so as to detect whether the network traffic is an abnormal access network traffic based on the traffic identification model.

Figure 2:
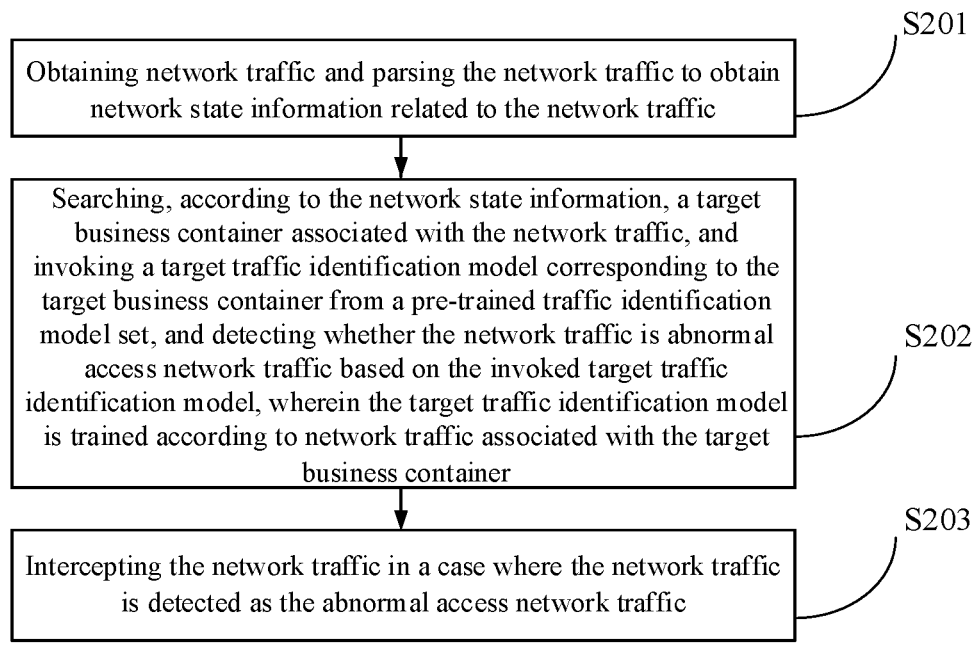
FIG. 2 is a flowchart of a traffic detection method provided by an embodiment of the present disclosure.

Referring to FIG. 2, it is a flowchart of a traffic detection method provided by an embodiment of the present disclosure. As shown in FIG. 2, the traffic detection method provided by the embodiment of the present disclosure includes steps S201-S204:

S201: Obtaining network traffic and parsing the network traffic to obtain network state information related to the network traffic.

Here, the network state information related to the network traffic can include Internet Protocol Address (IP) five-tuple information, Uniform Resource Locator (URL) address, request body (Body) parameter information, etc.

In practical applications, the network traffic is generally in the form of Transmission Control Protocol (TCP) data packets. Deep Packet Inspection (DPI) technology can be used to parse Transmission Control Protocol (TCP) messages into Hyper Text Transfer Protocol (HTTP) messages, thus parsing to obtain the network state information related to the network traffic.

In some possible implementations, the network traffic can be obtained through a network hook.

S202: Searching, according to the network state information, a target business container associated with the network traffic, and invoking a target traffic identification model corresponding to the target business container from a pre-trained traffic identification model set, and detecting whether the network traffic is abnormal access network traffic based on the invoked target traffic identification model, wherein the target traffic identification model is trained according to network traffic associated with the target business container.

Here, for the pre-trained traffic identification model set, the traffic identification model set includes a plurality of traffic identification models, and each traffic identification model stores a business container corresponding thereto. Therefore, the target traffic identification model corresponding to the target business container can be determined through the target business container associated with the network traffic, so as to perform traffic detection based on the target traffic identification model subsequently.

Therefore, in the case where the network state information includes the IP five-tuple information, in order to invoke the target traffic identification model corresponding to the target traffic container from the pre-trained traffic identification model set, in some possible implementations, the searching, according to the network state information, the target business container associated with the network traffic, and invoking the target traffic identification model corresponding to the target business container from the pre-trained traffic identification model set, includes:

determining a target business container group associated with the network traffic according to a source IP address and a destination IP address in the IP five-tuple information, wherein the target business container group includes a source container matched with the source IP address and a destination container matched with the destination IP address;

obtaining the target traffic identification model corresponding to the target business container group from the pre-trained traffic identification model set.

In this step, in the case where the network state information includes the IP five-tuple information, according to the source IP address and the destination IP address in the IP five-tuple information, it can be understood that the source IP address and the destination IP address are a group of IP addresses having a business access relationship, so a set of target business container groups having a business access relationship, that is, a target business container group associated with the network traffic, can be determined. The target business container group includes a source container matched with the source IP address and a destination container matched with the destination IP address. Here, each target business container group corresponds to a pre-trained traffic identification model. In the case where the target business container group associated with the network traffic is determined, the target traffic identification model corresponding to the target business container group can be determined from the pre-trained traffic identification model set with the aid of the target business container group.

Optionally, in some possible implementations, in order to determine the target business container group associated with the network traffic, not only the source IP address and the destination IP address in the IP five-tuple information may be obtained, but also the URL request indicated by the URL address and the Body parameter may be obtained, so as to assist in determining the business characteristics of the target business container group and to improve the accuracy of subsequently determining the target traffic identification model matched with the target business container group.

Illustratively, for a certain network traffic, the data shown in Table 1 below can be extracted from the network traffic:

TABLE 1

| Source IP address | Source container | Destination IP address | Destination container | URL request | Body parameter |
|---|---|---|---|---|---|
| 10.224.41.163 | trade | 10.224.60.24 | order | /order/detail | {orderNo: 23} |
| 10.224.41.180 | trade | 10.224.60.34 | order | /order/query | {orderType: "food"} |
| 10.224.41.168 | trade | 10.224.60.18 | order | /order/modify | {msg: "thanks", address: "street11"} |

TABLE 1-continued

| Source IP address | Source container | Destination IP address | Destination container | URL request | Body parameter |
|---|---|---|---|---|---|
| 10.224.41.163 | trade | 10.224.104.195 | payment | /pay/transfer | {amount: 1000.00, user id: 3217} |
| 10.224.41.180 | trade | 10.224.104.196 | payment | /pay/cancel | {id: "260b45e1a9e4"} |

Specifically, taking the first row in Table 1 as an example, the source IP address 10.224.41.163 and the destination IP address 10.224.60.24 can be extracted from the IP five-tuple information in the network traffic, so that the source container "trade" matched with the source IP address and the destination container "order" matched with the destination IP address can be determined. Meanwhile, The URL request "/order/detail" indicated by the uniform resource locator (URL) address and the Body parameter "{orderNo:23}" can also be extracted from the network traffic. Therefore, it can be determined that the source container has trade characteristics and the destination container has order characteristics, and they are a set of target business container groups having a business access relationship of order trade. In the case where the target business container group is determined, the target traffic identification model corresponding to the target business container group can be determined from the pre-trained traffic identification model set.

In this way, through the division of business container groups, the near-source aggregation of business containers in the business scene is achieved. Each business container group corresponds to a pre-trained traffic identification model, so as to realize targeted detection of business near-source network traffic and achieve accurate protection in the container network environment.

Further, when the source container accesses the destination container, there are multiple ports on the source container and the destination container. In order to determine the ports used for business access, the source port and the destination port in the IP five-tuple information can be determined, so that network traffic can be transmitted through the source port of the source container and the destination port of the destination container to realize business access.

Figure 3:
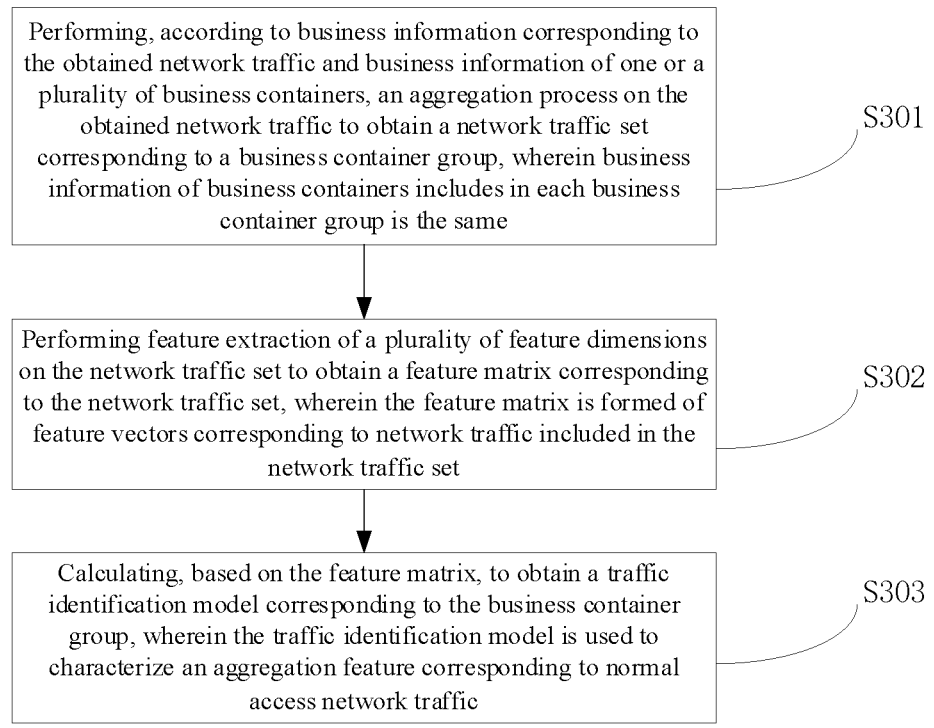
FIG. 3 is a flowchart of a traffic identification model training method provided by an embodiment of the present disclosure.

The traffic identification models in the traffic identification model set described in the above embodiments of the present disclosure are pre-trained. Referring to FIG. 3, it is a flowchart of a traffic identification model training method provided by an embodiment of the present disclosure, and the traffic identification model training method includes steps S301~S303:

S301: Performing, according to business information corresponding to the obtained network traffic and business information of each business container, an aggregation process on the obtained network traffic to obtain a network traffic set corresponding to each business container group, wherein business information of business containers included in each business container group is the same.

In this step, when model training is needed, the network traffic used for training and business information corresponding thereto can be obtained, and at the same time, business information of each business container can be obtained. Here, the business information of business containers in each business container group is the same, and the same business information can be determined by comparing the business information. Therefore, for each business container group, the obtained network traffic corresponding to the same business information can be aggregated to generate a network traffic set, that is, to generate the network traffic set corresponding to each business container group.

The business information of each business container can be obtained through the Application Programming Interface (API) of the container scheduling system, and the business information includes the business attribute information of each business container.

Illustratively, the business attribute information of each business container, such as nginx, mysql, kafka, etc., can be obtained through the Deployment or ReplicaSet information in the K8S container scheduling system.

S302: Performing feature extraction of a plurality of feature dimensions on the network traffic set to obtain a feature matrix corresponding to the network traffic set, wherein the feature matrix is formed of feature vectors corresponding to network traffic in the network traffic set.

In this step, in the case where the network traffic set is generated, feature extraction of a plurality of feature dimensions can be performed on the network traffic set, so that feature vectors in the plurality of feature dimensions can be obtained correspondingly; and the feature matrix corresponding to the network traffic set can be obtained by combining the feature vectors.

Specifically, in some possible implementations, feature extraction can be performed on the uniform resource locator (URL) address and the request body (Body) parameter in the network traffic set, respectively, to obtain a URL feature set and a Body parameter feature set included in the feature matrix.

It can be understood that based on the extracted URL feature set and Body parameter feature set, the feature matrix corresponding to the network traffic set can be formed.

Furthermore, in some possible implementations, performing feature extraction on the uniform resource locator (URL) address in the network traffic set can be achieved by extracting the accessed resource path from the URL address of each network traffic in the network traffic set through a regular expression to obtain a URL feature of each network traffic, and then performing de-duplication on the URL feature of each network traffic in the network traffic set to obtain the URL feature set corresponding to the network traffic set.

In this step, the regular expression method can be used to detect whether there exists a character string matched with the resource path pattern in the URL address of each network traffic in the network traffic set, and if so, the URL address can be filtered to extract the accessed resource path from the URL address, and further, the URL feature of each network traffic can be obtained. In practical applications, there are cases of the same URL address and the same resource path in the network traffic, so in order to reduce the resource occupation and improve the training speed of the traffic identification model, the URL feature of each network traffic in the network traffic set can be de-duplicated to remove the duplicate URL features, thereby obtaining the URL feature set corresponding to the network traffic set.

Further, in some possible implementations, for some random characters in the URL address, character cleaning can also be performed by the regular expression method.

Accordingly, in some possible implementations, the performing feature extraction on the request body (Body) parameter in the network traffic set includes:

extracting, for each access data packet in the network traffic set, features of the Body parameter of the network traffic in a plurality of character-related dimensions;

obtaining, based on the features of the Body parameter of each network traffic included in the network traffic set in the plurality of character-related dimensions, the Body parameter feature set corresponding to the network traffic set.

Here, the plurality of character-related dimensions includes length of character string, number of special characters, proportion of letters, and proportion of numbers, etc. For each network traffic in the network traffic set, the length of character string, number of special characters, proportion of letters, and proportion of numbers in the Body parameter of the network traffic can be extracted, so as to obtain features of the Body parameter of each network traffic in the plurality of character-related dimensions, and further, the features in the plurality of character-related dimensions can be integrated to obtain the Body parameter feature set corresponding to the network traffic set.

Here, the Body parameter generally has a Key-Value parameter structure, the Key is related to the type of input parameter, and the Value is related to the business category. In order to improve the effectiveness and business relevance of feature extraction, feature extraction can be mainly performed on the Value in the Body parameter.

Extracting the length of character string in the Body parameter is to determine the length of the character string of the Value. In practical applications, the length of the character string corresponding to the offensive network traffic is generally not fixed, and has a significant deviation from the length of the character string corresponding to the normal access network traffic.

Extracting the number of special characters in the Body parameter is to determine the number of the special characters in the Value. If there are special characters, such as *, $, %, &, etc., in the Value, it generally corresponds to the offensive network traffic.

Extracting the proportion of letters in the Body parameter is to determine the proportion of the letter-type characters in all characters in the Value; and extracting the proportion of numbers in the Body parameter is to determine the proportion of numeric-type characters in all characters in the Value.

S303: Calculating, based on the feature matrix, to obtain a traffic identification model corresponding to the business container group, wherein the traffic identification model is used to characterize an aggregation feature corresponding to normal access network traffic.

In this step, the traffic identification model corresponding to the business container group can be obtained by calculating based on the feature matrix corresponding to the source container and the feature matrix corresponding to the destination container in the business container group.

Here, in some possible implementations, intermediate traffic identification models corresponding to single traffic container can be obtained by calculating based on the feature matrix corresponding to the source container and the feature matrix corresponding to the destination container respectively, and then integrated to obtain the traffic identification model corresponding to the traffic container group.

Optionally, in some other possible implementations, the feature matrix corresponding to the source container and the feature matrix corresponding to the destination container can be integrated to obtain an intermediate feature matrix corresponding to the business container group, and then the traffic identification model corresponding to the business container group can be obtained by calculating.

Specifically, in some possible implementations, the calculating, based on the feature matrix, to obtain the traffic identification model corresponding to the business container group includes:

calculating, based on the Body parameter feature set, a confidence interval of the Body parameter of the network traffic set in each feature dimension;

adopting the URL feature set of the network traffic set and the confidence interval of the Body parameter in each feature dimension to form the traffic identification model.

In this step, in the case where the URL feature set and the Body parameter feature set corresponding to the network traffic set are determined, the confidence interval of the Body parameter of the network traffic set in each feature dimension can be calculated based on the Body parameter feature set, so that the traffic identification model is formed by adopting the URL feature set of the network traffic set and the confidence interval of the Body parameter in each feature dimension.

Based on the above content, it can be known that the Body parameter feature set includes the features of the Body parameter of the network traffic in character-related dimensions, such as length of character string, number of special characters, proportion of letters, and proportion of numbers, etc., and these features are all numeric features, so the feature calculation method in each dimension is the same.

Specifically, in some possible implementations, in order to calculate the confidence interval of the Body parameter in each feature dimension, for features in each feature dimension, the mean $\mu$ and standard deviation $\sigma$ of the features can be calculated first, and then according to Chebyshev's theorem, a set of data $\{x_1, x_2, \ldots, x_n\}$ is given, with the mean $\mu$ and standard deviation $\sigma$. And for any $k \geq 1$, the proportion of the data located in the interval $[\mu - k*\sigma, \mu + k*\sigma]$ is $p \geq 1 - 1/k^2$. Here, k is the tolerance. The greater the value of k, the greater the probability that the feature value falls within the interval. If the current feature value does not fall within the interval, in means that the similarity between the feature and the normal feature in this feature dimension is lower, and the probability that the access data packet corresponding thereto is abnormal is greater. The confidence threshold is calculated as $\rho = \mu \pm k*\sigma$ through mathematical transformation.

$$P\{|X - \mu| \geq k\sigma\} \leq \frac{1}{k^2}$$

where $\mu$ is the mean, $\sigma$ is the standard deviation, k is any value (k>0), and P is the probability estimate of sample X.

By setting the value of k, the confidence interval $\rho = [\rho_1, \rho_2]$ in the current feature dimension can be calculated. The greater the value of k is set, the lower the tolerance for abnormal access.

Further, in the case where the confidence interval of the Body parameter in each feature dimension is determined, an integrated confidence interval $P = \{\rho_1, \rho_2, \ldots, \rho_j\}$ corresponding to the Body parameter can be obtained by integration, so that the traffic identification model Y={U, P} can be formed by using the URL feature set U of the network traffic set and the integrated confidence interval P corresponding to the Body parameter.

Based on the above content, it can be known that the target traffic identification model corresponding to the target business container can be invoked from the pre-trained traffic identification model set, and then the network traffic can be detected through the target traffic identification model.

Accordingly, in some possible implementations, the detecting whether the network traffic is the abnormal access network traffic based on the invoked target traffic identification model includes:

performing feature extraction on a uniform resource locator (URL) address and a request body (Body) parameter in the network traffic, respectively, to obtain a URL feature included in a feature vector of the network traffic and parameter features of the Body parameter in a plurality of feature dimensions;

determining whether the network traffic is the abnormal access network traffic based on the extracted feature vector, as well as the URL feature set indicated in the target traffic identification model and the confidence interval of the Body parameter in each feature dimension.

In this step, firstly, feature extraction can be performed on the network traffic to obtain a feature vector of the network traffic. Herein, the method of feature extraction performed on the network traffic is similar to the method of feature extraction of the plurality of feature dimensions performed on the network traffic set as described above, and the methods of feature extraction respectively performed on the uniform resource locator (URL) address and the request body (Body) parameter in the network traffic is similar to the methods of feature extraction respectively performed on the uniform resource locator (URL) address and the request body (Body) parameter in the network traffic set as described above, and details are not repeated here.

It can be understood that the feature vector of the network traffic can be formed based on the extracted URL feature and the parameter features of the Body parameter in the plurality of feature dimensions.

Then, in the case where the feature vector is extracted from the network traffic and the target traffic identification model is obtained, because the target traffic identification model characterizes an aggregation feature corresponding to normal access network traffic, the feature vector is compared with the target traffic identification model, so that it can be determined whether the network traffic is the abnormal access network traffic.

It can be known from the above content that the target traffic identification model is formed by adopting the URL feature set of the network traffic set and the confidence interval of the Body parameter in each feature dimension.

Therefore, the extracted feature vector can be compared and matched with URL feature set indicated in the target traffic identification model and the confidence interval of the Body parameter in each feature dimension, so as to determine whether the network traffic is the abnormal access network traffic.

Specifically, in some possible implementations, it can include: determining whether the URL feature of the network traffic belongs to the URL feature set and whether the parameter feature of the Body parameter in each feature dimension belongs to the confidence interval based on the URL feature of the network traffic indicated by the feature vector and the parameter features of the Body parameter of the network traffic in the plurality of feature dimensions;

determining an abnormal probability corresponding to the network traffic according to a determination result and weight values respectively corresponding to the URL feature and each feature dimension of and the Body parameter;

determining that the network traffic is the abnormal access network traffic in a case where the abnormal probability is greater than a set threshold, otherwise determining that the network traffic is a normal access network traffic.

In this step, firstly, it can be determined whether the URL feature of the network traffic belongs to the URL feature set indicated in the target traffic identification model based on the URL feature of the network traffic indicated by the feature vector, and it can be determined whether the parameter feature of the Body parameter of the network traffic in each feature dimension belongs to the confidence interval based on the parameter features of the Body parameter of the network traffic in the plurality of feature dimensions as indicated by the feature vector, thus obtaining a determination result. Here, if the URL feature of the network traffic indicated by the feature vector does not belong to the URL feature set indicated in the target traffic identification model, it can be determined that the network traffic is abnormal; if the parameter features of the Body parameter of the network traffic in the plurality of feature dimensions as indicated by the feature vector do not belong to the confidence intervals, it can be determined that the network traffic is abnormal; and the abnormal probability corresponding to the network traffic is determined through mathematical transformation according to the determination result and the weight values respectively corresponding to the URL feature and each feature dimension of the Body parameter, as shown in the following formula:

$$y = \sum_{k=1}^{K} p_i * \sigma_i$$

where $p_i$ is the determination result of feature abnormality (abnormal is 1, normal is 0), and $\sigma_i$ is the weight of this feature dimension.

Further, a set threshold pre-configured for the network traffic can be obtained; in the case where the abnormal probability corresponding to the network traffic is greater than the set threshold, the access detection result corresponding to the network traffic is determined to be abnormal access, and the current network traffic is determined to be abnormal access network traffic; otherwise, in the case where the abnormal probability corresponding to the network traffic is less than the set threshold, the access detection result corresponding to the network traffic is determined to be normal access, and the current network traffic is determined to be normal access network traffic.

S203: Intercepting the network traffic in a case where the network traffic is detected as the abnormal access network traffic.

Here, in order to ensure the security and stability of data access, the abnormal access network traffic can be intercepted, so as to ensure that all the network traffic being accessed passes the detection.

The traffic detection method provided by the embodiment of the present disclosure can obtain network traffic and parse the network traffic to obtain network state information related to the network traffic; search, according to the network state information, a target business container associated with the network traffic, and invoke a target traffic identification model corresponding to the target business container from a pre-trained traffic identification model set, and detect whether the network traffic is abnormal access network traffic based on the called target traffic identification model, wherein the target traffic identification model is trained according to network traffic associated with the target business container; and intercept the network traffic in a case where the network traffic is detected as the abnormal access network traffic.

In this way, in the embodiment of the present disclosure, firstly, for the business container of each business form, a traffic identification model matched with the business container is trained based on the network traffic corresponding to the business information of the business container; when performing network traffic detection, the business container associated with the network traffic can be searched, the target traffic identification model corresponding to the business container is invoked from the pre-trained traffic identification model set, and the network traffic is detected through the called target traffic identification model. In the embodiment of the present disclosure, traffic detection can be performed on business containers of different business meanings by using different traffic identification models, and network traffic detection adapted to the business feature of the business container is performed for the network traffic of each business container. Compared with the conventional unified detection strategy, risk identification and filtering can be performed more accurately, thereby reducing the cases of false negative or false positive of abnormal traffic.

On this basis, it can intercept the accurately identified abnormal access network traffic, thus improving access security, avoiding unnecessary interception and ensuring normal network access in the container environment.

Figure 4:
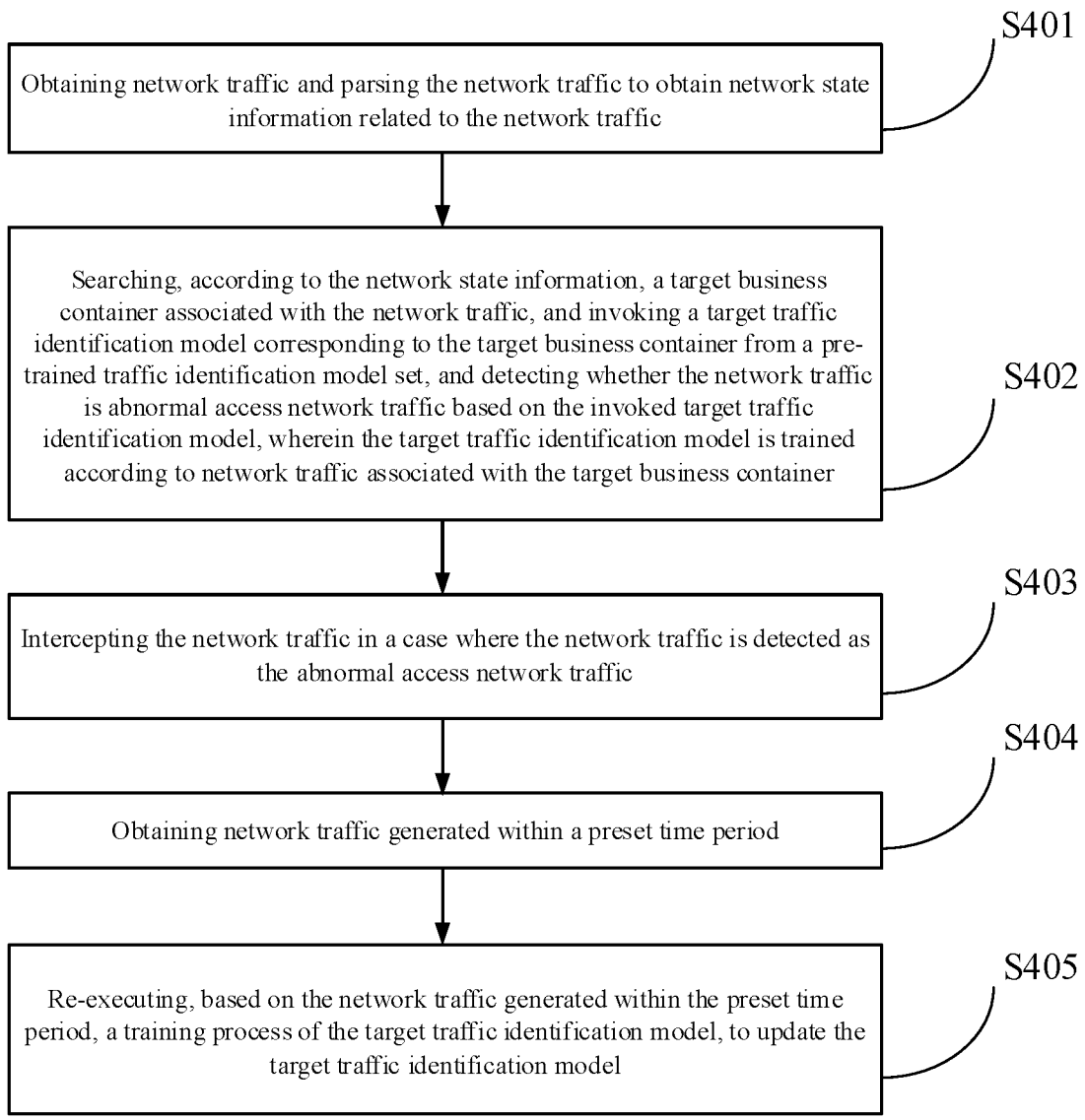
FIG. 4 is a flowchart of another traffic detection method provided by an embodiment of the present disclosure.

Referring to FIG. 4, it is a flowchart of another traffic detection method provided by an embodiment of the present disclosure. As shown in FIG. 4, the traffic detection method provided by the embodiment of the present disclosure includes steps S401-S405:

S401: Obtaining network traffic and parsing the network traffic to obtain network state information related to the network traffic.

S402: Searching, according to the network state information, a target business container associated with the network traffic, and invoking a target traffic identification model corresponding to the target business container from a pre-trained traffic identification model set, and detecting whether the network traffic is abnormal access network traffic based on the invoked target traffic identification model, wherein the target traffic identification model is trained according to network traffic associated with the target business container.

S403: Intercepting the network traffic in a case where the network traffic is detected as the abnormal access network traffic.

The description of steps S401 to S403 can refer to the description of steps S201 to S203, and they can achieve the same technical effects and solve the same technical problems, and details are not repeated here.

S404: Obtaining network traffic generated within a preset time period.

S405: Re-executing, based on the network traffic generated within the preset time period, a training process of the target traffic identification model, to update the target traffic identification model.

It can be known from the above content that the target traffic identification model corresponds to the target traffic container group, and the target traffic container group is associated with the network traffic. Therefore, if the source container and the destination container in the business container group change, that is, after the target traffic identification model is obtained by training, in the case where the target business container generates network traffic again, the target traffic identification model needs to be adjusted and updated accordingly, thus effectively enhancing the robustness of the target traffic identification model.

Figure 5:
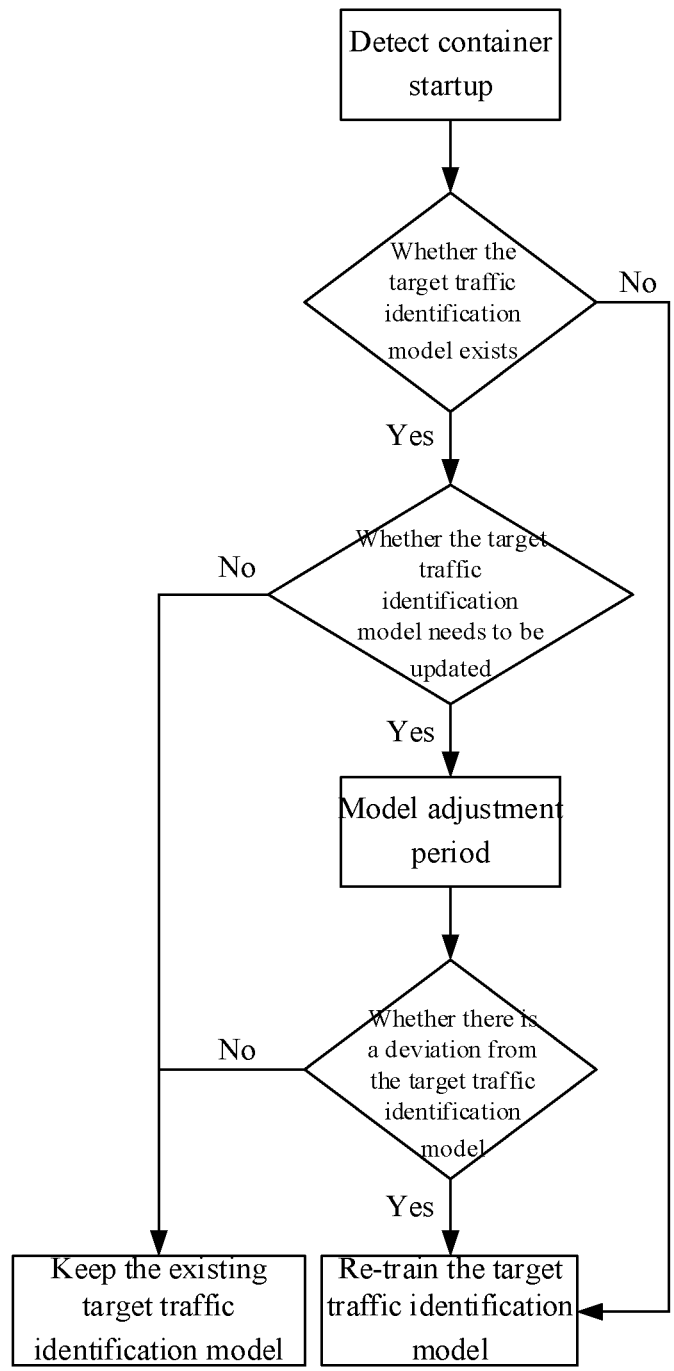
FIG. 5 is a flowchart of a traffic identification model updating method provided by an embodiment of the present disclosure.

Meanwhile, referring to FIG. 5, it is a flowchart of a traffic identification model updating method provided by an embodiment of the present disclosure. As shown in FIG. 5, when it is detected that the source container and the destination container in the target traffic container group are started, that is, when it is detected that business access is carried out between the source container and the destination container in the target business container group, it can be detected whether a corresponding target traffic identification model currently exists in the target traffic container group. If a corresponding target traffic identification model does not exist, model training can be performed. The method of model training is similar to that described above, and details are not repeated here. If the corresponding target traffic identification model exists, it can be determined whether the target traffic identification model needs to be updated, specifically, it can be detected whether the identifiers of mirrors corresponding to the source container and the destination container in the target business container group have changed; if the identifiers have not changed, it is determined that the target traffic identification model does not need to be updated, and the existing target traffic identification model can continue to be used; if the identifiers have changed, it is determined that the target traffic identification model needs to be updated.

Then, the target traffic identification model enters a model adjustment period. Here, the length of the model adjustment period can be set according to the specific business conditions of the target business container group, such as one hour, etc. If the target traffic identification model is within the model adjustment period, it is determined that there is no deviation from the target traffic identification model, that is, the target traffic identification model can continue to use the existing near-source model. If the near-source model is not within the model adjustment period, it is determined that there is a deviation from the near-source model, and at this time, the network traffic generated by the target container within a preset time period can be obtained, and the training process of the target traffic identification model is re-executed based on the network traffic generated within the preset time period, so as to update the target traffic identification model. It can be understood that the updated target traffic identification model corresponds to the current business container group.

The traffic detection method provided by the embodiment of the present disclosure can obtain network traffic and parse the network traffic to obtain network state information related to the network traffic; search, according to the network state information, a target business container associated with the network traffic, and invoke a target traffic identification model corresponding to the target business container from a pre-trained traffic identification model set, and detect whether the network traffic is abnormal access network traffic based on the called target traffic identification model, wherein the target traffic identification model is trained according to network traffic associated with the target business container; and intercept the network traffic in a case where the network traffic is detected as the abnormal access network traffic.

In this way, in the embodiment of the present disclosure, firstly, for the business container of each business form, a traffic identification model matched with the business container is trained based on the network traffic corresponding to the business information of the business container; when performing network traffic detection, the business container associated with the network traffic can be searched, the target traffic identification model corresponding to the business container is invoked from the pre-trained traffic identification model set, and the network traffic is detected through the called target traffic identification model. In the embodiment of the present disclosure, traffic detection can be performed on business containers of different business meanings by using different traffic identification models, and network traffic detection adapted to the business feature of the business container is performed for the network traffic of each business container. Compared with the conventional unified detection strategy, risk identification and filtering can be performed more accurately, thereby reducing the cases of false negative or false positive of abnormal traffic.

Further, it can intercept the accurately identified abnormal access network traffic, thus improving access security, avoiding unnecessary interception and ensuring normal network access in the container environment.

It shall be understood by those skilled in the art that, in the above-mentioned methods of specific embodiments, the expressed order of respective steps does not mean a strict execution sequence to constitute any limitation on the implementation process, and the specific execution sequence of respective steps should be determined by their functions and the possible internal logic.

Based on the same inventive concept, the embodiments of the present disclosure further provide a traffic detection apparatus corresponding to the traffic detection method. Because the apparatus in the embodiments of the present disclosure solves the problem in a similar principle to the traffic detection method in the embodiments of the present disclosure, the implementation of the apparatus may refer to the implementation of the method, and details are not repeated herein.

Figure 6:
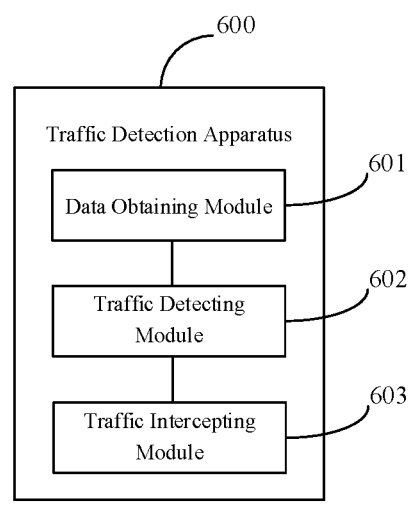
FIG. 6 is a first schematic diagram of a traffic detection apparatus provided by an embodiment of the present disclosure.
Figure 7:
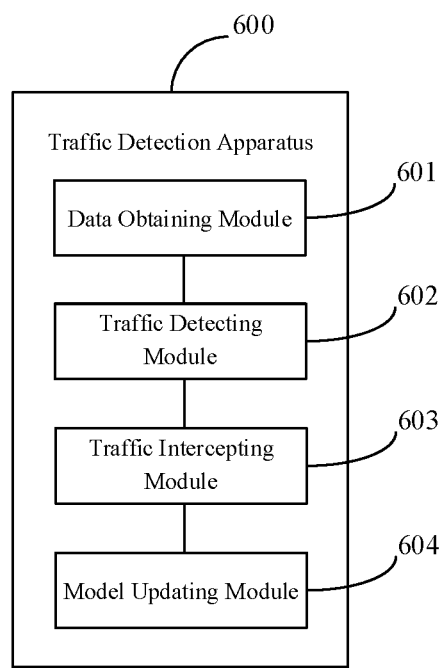
FIG. 7 is a second schematic diagram of a traffic detection apparatus provided by an embodiment of the present disclosure.

Referring to FIG. 6 and FIG. 7, FIG. 6 is a first schematic diagram of a traffic detection apparatus provided by an embodiment of the present disclosure, and FIG. 7 is a second schematic diagram of a traffic detection apparatus provided by an embodiment of the present disclosure. As shown in FIG. 6, the traffic detection apparatus 600 provided by an embodiment of the present disclosure includes:

a data obtaining module 601, configured to obtain network traffic and parse the network traffic to obtain network state information related to the network traffic;

a traffic detecting module 602, configured to search, according to the network state information, a target business container associated with the network traffic, and invoke a target traffic identification model corresponding to the target business container from a pre-trained traffic identification model set, and detect whether the network traffic is abnormal access network traffic based on the invoked target traffic identification model, wherein the target traffic identification model is trained according to network traffic associated with the target business container;

a traffic intercepting module 603, configured to intercept the network traffic in a case where the network traffic is detected as the abnormal access network traffic.

In an optional implementation, the network state information includes IP five-tuple information; the traffic detecting module 602, when configured to search, according to the network state information, the target business container associated with the network traffic, and invoke the target traffic identification model corresponding to the target business container from the pre-trained traffic identification model set, is specifically configured to:

determine a target business container group associated with the network traffic according to a source IP address and a destination IP address in the IP five-tuple information, wherein the target business container group includes a source container matched with the source IP address and a destination container matched with the destination IP address;

obtain the target traffic identification model corresponding to the target business container group from the pre-trained traffic identification model set.

In an optional implementation, the traffic detecting module 602 trains to obtain traffic identification models in the traffic identification model set according to the following steps:

performing, according to business information corresponding to the obtained network traffic and business information of one or a plurality of business containers, an aggregation process on the obtained network traffic to obtain a network traffic set corresponding to a business container group, wherein business information of business containers included in each business container group is the same;

performing feature extraction of a plurality of feature dimensions on the network traffic set to obtain a feature matrix corresponding to the network traffic set, wherein the feature matrix is formed of feature vectors corresponding to network traffic included in the network traffic set;

calculating, based on the feature matrix, to obtain a traffic identification model corresponding to the business container group, wherein the traffic identification model is used to characterize an aggregation feature corresponding to normal access network traffic.

In an optional implementation, the apparatus further includes a model updating module 604, and the model updating module 604 is configured to:

obtain network traffic generated within a preset time period;

re-execute, based on the network traffic generated within the preset time period, a training process of the target traffic identification model, to update the target traffic identification model.

In an optional implementation, the traffic detecting module 602, when configured to perform feature extraction of the plurality of feature dimensions on the network traffic set to obtain the feature matrix corresponding to the network traffic set, is specifically configured to:

perform feature extraction on a uniform resource locator (URL) address and a request body (Body) parameter in the network traffic set, respectively, to obtain a URL feature set and a Body parameter feature set included in the feature matrix;

the traffic detecting module 602, when configured to calculate, based on the feature matrix, to obtain the traffic identification model corresponding to the business container group, is specifically configured to:

calculate, based on the Body parameter feature set, a confidence interval of the Body parameter of the network traffic set in each feature dimension;

adopt the URL feature set of the network traffic set and the confidence interval of the Body parameter in each feature dimension to form the traffic identification model.

In an optional implementation, the traffic detecting module 602, when configured to perform feature extraction on the request body (Body) parameter in the network traffic set, is specifically configured to:

extract, for each network traffic in the network traffic set, features of the Body parameter of the network traffic in a plurality of character-related dimensions;

obtain, based on the features of Body parameters of the network traffic included in the network traffic set in the plurality of character-related dimensions, the Body parameter feature set corresponding to the network traffic set.

In an optional implementation, the traffic detecting module 602, when configured to detect whether the network traffic is the abnormal access network traffic based on the invoked target traffic identification model, is specifically configured to:

perform feature extraction on a uniform resource locator (URL) address and a request body (Body) parameter in the network traffic, respectively, to obtain a URL feature included in a feature vector of the network traffic and parameter features of the Body parameter in a plurality of feature dimensions;

determine whether the network traffic is the abnormal access network traffic based on the extracted feature vector, as well as the URL feature set indicated in the target traffic identification model and the confidence interval of the Body parameter in each feature dimension.

In an optional implementation, the traffic detecting module 602, when configured to determine whether the network traffic is the abnormal access network traffic based on the extracted feature vector, as well as the URL feature set indicated in the target traffic identification model and the confidence interval of the Body parameter in each feature dimension, is specifically configured to:

determine whether the URL feature of the network traffic belongs to the URL feature set and whether the parameter feature of the Body parameter in each feature dimension belongs to the confidence interval based on the URL feature of the network traffic indicated by the feature vector and the parameter features of the Body parameter of the network traffic in the plurality of feature dimensions;

determine an abnormal probability corresponding to the network traffic according to a determination result and weight values respectively corresponding to the URL feature and each feature dimension of and the Body parameter;

determine that the network traffic is the abnormal access network traffic in a case where the abnormal probability is greater than a set threshold, otherwise determine that the network traffic is a normal access network traffic.

The description of the processing flow of the modules in the apparatus, and the interaction flow between the modules can be referred to the relevant description in the above method embodiments, and details are not repeated herein.

Figure 8:
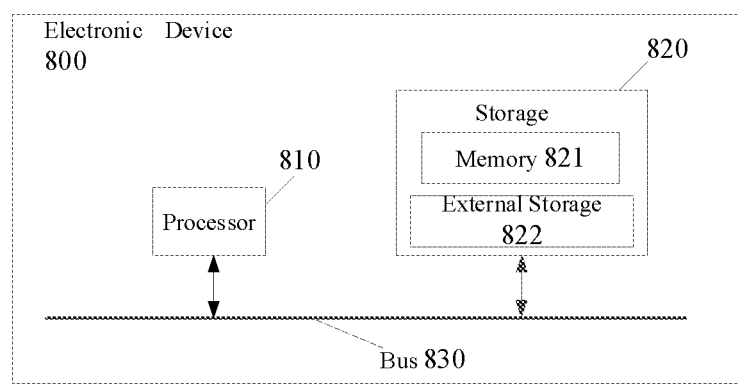
FIG. 8 is a schematic diagram of an electronic device provided by an embodiment of the present disclosure.

Based on the same technical concept, an embodiment of the present disclosure further provides an electronic device. Referring to FIG. 8, which is a schematic structural diagram of an electronic device 800 provided by the embodiment of the present disclosure, and the electronic device 800 includes:

a processor 810, a storage 820 and a bus 830; wherein the storage 820 is configured to store execution instructions, and includes a memory 821 and an external storage 822; the memory 821 here is also referred to as internal storage, and is configured to temporarily store operation data in the processor 810, and the data exchanged with the external storage 822, such as hard disk, etc.; the processor 810 exchanges data with the external storage 822 through the memory 821; and when the electronic device 800 runs, the processor 810 communicates with the storage 820 through the bus 830, so that the processor 810 can execute the execution instructions mentioned in the embodiments of the traffic detection method described above.

An embodiment of the present disclosure further provides a computer-readable storage medium, wherein the computer-readable storage medium stores a computer program, and the computer program, when run by a processor, executes the steps of the traffic detection method in the foregoing method embodiments. The storage medium can be a volatile or non-volatile computer-readable storage medium.

An embodiment of the present disclosure further provides a computer program product, wherein the computer program product includes computer instructions, and the computer instructions, when executed by a processor, executes the steps of the traffic detection method in the foregoing method embodiments. Details can refer to the foregoing method embodiments, and are not repeated here.

The computer program product can be specifically implemented by hardware, software, or a combination thereof. In an optional embodiment, the computer program product is specifically embodied as a computer storage medium, and in another optional embodiment, the computer program product is specifically embodied as a software product, such as a software development kit (SDK), etc.

It can be clearly understood by those skilled in the art that for the convenience and conciseness of description, the specific working processes of the system and apparatus described above can refer to corresponding processes in the aforementioned method embodiments, and will not be repeated here. In several embodiments provided by the present disclosure, it should be understood that the disclosed system, apparatus and method can be realized in other ways. The apparatus embodiments described above are only illustrative, for example, the division of the units is only a kind of logical function division, and there can be another division method in actual implementation. For example, multiple units or components can be combined or integrated into another system, or some features may be ignored or not implemented. On the other hand, the mutual coupling or direct coupling or communication connection shown or discussed can be indirect coupling or communication connection through some communication interfaces, apparatuses or units, which can be in electrical, mechanical or other forms.

The units described as separate components may or may not be physically separated, and the components shown as units may or may not be physical units, that is, they may be located in one place or distributed to multiple network units. Some or all of the units can be selected according to actual needs to achieve the purpose of the solution of the present embodiment.

In addition, various functional units in various embodiments of the present disclosure can be integrated into one processing unit, or each unit may exist physically alone, or two or more units may be integrated into one unit.

If the functions are realized in the form of software functional units and sold or used as independent products, they can be stored in a processor-executable non-volatile computer-readable storage medium. Based on such an understanding, the technical solutions of the present disclosure essentially, or the part contributing to the related art, or part of the technical solutions may be implemented in the form of a software product, which is stored in a storage medium and includes several instructions for enabling a computing device (e.g., a personal computer, a server, a network device, or the like) to perform all or some of the steps of the methods described in the embodiments of the present disclosure. The foregoing storage medium includes: USB flash disk, mobile hard disk, Read-Only Memory (ROM), Random Access Memory (RAM), magnetic disc, or optical disc and any other medium that can store program codes.

Finally, it should be noted that the above-mentioned embodiments are only specific embodiments of the present disclosure, which are used to illustrate the technical scheme of the present disclosure, but not to limit it. The protection scope of the present disclosure is not limited thereto. Although the present disclosure has been described in detail with reference to the above-mentioned embodiments, it should be understood by ordinary people in the field that any person skilled in the art and familiar with the technical field can still make modifications to the technical solutions described in the foregoing embodiments or can easily think of changes within the technical scope disclosed in the present disclosure, or perform equivalent substitutions to some of the technical features; however, these modifications, changes or substitutions do not cause the essence of the corresponding technical solutions to deviate from the scope of the technical solutions of the embodiments in the present disclosure, and should be included within the protection scope of the present disclosure. Therefore, the protection scope of the present disclosure should be based on the protection scope of the claims.

The invention claimed is:

1. A traffic detection method, comprising:
    obtaining network traffic and parsing the network traffic to obtain network state information related to the network traffic;
    searching, according to the network state information, a target business container associated with the network traffic, and invoking a target traffic identification model corresponding to the target business container from a pre-trained traffic identification model set, and detecting whether the network traffic is abnormal access network traffic based on the invoked target traffic identification model, wherein the target traffic identification model is trained according to network traffic associated with the target business container;
    intercepting the network traffic in a case where the network traffic is detected as the abnormal access network traffic,
    wherein the detecting whether the network traffic is the abnormal access network traffic based on the invoked target traffic identification model comprises:
        performing feature extraction on a uniform resource locator (URL) address and a request body (Body) parameter in the network traffic, respectively, to obtain a URL feature comprised in a feature vector of the network traffic and parameter features of the Body parameter in a plurality of feature dimensions;
        determining whether the network traffic is the abnormal access network traffic based on the extracted feature vector, as well as the URL feature set indicated in the target traffic identification model and the confidence interval of the Body parameter in each feature dimension.

2. The method according to claim 1, wherein the network state information comprises Internet Protocol (IP) five-tuple information; the searching, according to the network state information, the target business container associated with the network traffic, and invoking the target traffic identification model corresponding to the target business container from the pre-trained traffic identification model set, comprises:
    determining a target business container group associated with the network traffic according to a source IP address and a destination IP address in the IP five-tuple information, wherein the target business container group comprises a source container matched with the source IP address and a destination container matched with the destination IP address;
    obtaining the target traffic identification model corresponding to the target business container group from the pre-trained traffic identification model set.

3. The method according to claim 1, wherein traffic identification models in the traffic identification model set are trained according to the following steps:
    performing, according to business information corresponding to the obtained network traffic and business information of one or a plurality of business containers, an aggregation process on the obtained network traffic to obtain a network traffic set corresponding to a business container group, wherein business information of business containers comprised in each business container group is the same;
    performing feature extraction of a plurality of feature dimensions on the network traffic set to obtain a feature matrix corresponding to the network traffic set, wherein the feature matrix is formed of feature vectors corresponding to network traffic comprised in the network traffic set;
    calculating, based on the feature matrix, to obtain a traffic identification model corresponding to the business container group, wherein the traffic identification model is used to characterize an aggregation feature corresponding to normal access network traffic.

4. The method according to claim 1, wherein after the target traffic identification model corresponding to the target traffic container is determined, the method further comprises:
    obtaining network traffic generated within a preset time period;
    re-executing, based on the network traffic generated within the preset time period, a training process of the target traffic identification model, to update the target traffic identification model.

5. The method according to claim 3, wherein the performing feature extraction of the plurality of feature dimensions on the network traffic set to obtain the feature matrix corresponding to the network traffic set comprises:
    performing feature extraction on a uniform resource locator (URL) address and a request body (Body) parameter in the network traffic set, respectively, to obtain a URL feature set and a Body parameter feature set comprised in the feature matrix;
    the calculating, based on the feature matrix, to obtain the traffic identification model corresponding to the business container group, comprises:

calculating, based on the Body parameter feature set, a confidence interval of the Body parameter of the network traffic set in each feature dimension;

adopting the URL feature set of the network traffic set and the confidence interval of the Body parameter in each feature dimension to form the traffic identification model.

6. The method according to claim 5, wherein the performing feature extraction on the request body (Body) parameter in the network traffic set comprises:

extracting, for each network traffic in the network traffic set, features of the Body parameter of the network traffic in a plurality of character-related dimensions;

obtaining, based on the features of Body parameters of the network traffic comprised in the network traffic set in the plurality of character-related dimensions, the Body parameter feature set corresponding to the network traffic set.

7. The method according to claim 1, wherein the determining whether the network traffic is the abnormal access network traffic based on the extracted feature vector, as well as the URL feature set indicated in the target traffic identification model and the confidence interval of the Body parameter in each feature dimension, comprises:

determining whether the URL feature of the network traffic belongs to the URL feature set and whether the parameter feature of the Body parameter in each feature dimension belongs to the confidence interval based on the URL feature of the network traffic indicated by the feature vector and the parameter features of the Body parameter of the network traffic in the plurality of feature dimensions;

determining an abnormal probability corresponding to the network traffic according to a determination result and weight values respectively corresponding to the URL feature and each feature dimension of and the Body parameter;

determining that the network traffic is the abnormal access network traffic in a case where the abnormal probability is greater than a set threshold, otherwise determining that the network traffic is a normal access network traffic.

8. An electronic device, comprising: a processor, a memory and a bus, wherein the memory stores machine-readable instructions executable by the processor, the processor communicates with the memory through the bus when the electronic device runs, and when the machine-readable instructions are executed by the processor, steps of a traffic detection method are executed, wherein the method comprises:

obtaining network traffic and parsing the network traffic to obtain network state information related to the network traffic;

searching, according to the network state information, a target business container associated with the network traffic, and invoking a target traffic identification model corresponding to the target business container from a pre-trained traffic identification model set, and detecting whether the network traffic is abnormal access network traffic based on the invoked target traffic identification model, wherein the target traffic identification model is trained according to network traffic associated with the target business container;

intercepting the network traffic in a case where the network traffic is detected as the abnormal access network traffic, wherein the detecting whether the network traffic is the abnormal access network traffic based on the invoked target traffic identification model comprises:

performing feature extraction on a uniform resource locator (URL) address and a request body (Body) parameter in the network traffic, respectively, to obtain a URL feature comprised in a feature vector of the network traffic and parameter features of the Body parameter in a plurality of feature dimensions;

determining whether the network traffic is the abnormal access network traffic based on the extracted feature vector, as well as the URL feature set indicated in the target traffic identification model and the confidence interval of the Body parameter in each feature dimension.

9. A computer-readable storage medium, wherein a computer program is stored on the computer-readable storage medium, and when the computer program is run by a processor, steps of a traffic detection method are executed, wherein the method comprises:

obtaining network traffic and parsing the network traffic to obtain network state information related to the network traffic;

searching, according to the network state information, a target business container associated with the network traffic, and invoking a target traffic identification model corresponding to the target business container from a pre-trained traffic identification model set, and detecting whether the network traffic is abnormal access network traffic based on the invoked target traffic identification model, wherein the target traffic identification model is trained according to network traffic associated with the target business container;

intercepting the network traffic in a case where the network traffic is detected as the abnormal access network traffic, wherein the detecting whether the network traffic is the abnormal access network traffic based on the invoked target traffic identification model comprises:

performing feature extraction on a uniform resource locator (URL) address and a request body (Body) parameter in the network traffic, respectively, to obtain a URL feature comprised in a feature vector of the network traffic and parameter features of the Body parameter in a plurality of feature dimensions;

determining whether the network traffic is the abnormal access network traffic based on the extracted feature vector, as well as the URL feature set indicated in the target traffic identification model and the confidence interval of the Body parameter in each feature dimension.

10. The electronic device according to claim 8, wherein the network state information comprises Internet Protocol (IP) five-tuple information; the searching, according to the network state information, the target business container associated with the network traffic, and invoking the target traffic identification model corresponding to the target business container from the pre-trained traffic identification model set, comprises:

determining a target business container group associated with the network traffic according to a source IP address and a destination IP address in the IP five-tuple information, wherein the target business container group comprises a source container matched with the source IP address and a destination container matched with the destination IP address;

obtaining the target traffic identification model corresponding to the target business container group from the pre-trained traffic identification model set.

11. The electronic device according to claim 8, wherein traffic identification models in the traffic identification model set are trained according to the following steps:
performing, according to business information corresponding to the obtained network traffic and business information of one or a plurality of business containers, an aggregation process on the obtained network traffic to obtain a network traffic set corresponding to a business container group, wherein business information of business containers comprised in each business container group is the same;
performing feature extraction of a plurality of feature dimensions on the network traffic set to obtain a feature matrix corresponding to the network traffic set, wherein the feature matrix is formed of feature vectors corresponding to network traffic comprised in the network traffic set;
calculating, based on the feature matrix, to obtain a traffic identification model corresponding to the business container group, wherein the traffic identification model is used to characterize an aggregation feature corresponding to normal access network traffic.

12. The electronic device according to claim 8, wherein after the target traffic identification model corresponding to the target traffic container is determined, the method further comprises:
obtaining network traffic generated within a preset time period;
re-executing, based on the network traffic generated within the preset time period, a training process of the target traffic identification model, to update the target traffic identification model.

13. The electronic device according to claim 12, wherein the performing feature extraction of the plurality of feature dimensions on the network traffic set to obtain the feature matrix corresponding to the network traffic set comprises:
performing feature extraction on a uniform resource locator (URL) address and a request body (Body) parameter in the network traffic set, respectively, to obtain a URL feature set and a Body parameter feature set comprised in the feature matrix;
the calculating, based on the feature matrix, to obtain the traffic identification model corresponding to the business container group, comprises:
calculating, based on the Body parameter feature set, a confidence interval of the Body parameter of the network traffic set in each feature dimension;
adopting the URL feature set of the network traffic set and the confidence interval of the Body parameter in each feature dimension to form the traffic identification model.

14. The electronic device according to claim 13, wherein the performing feature extraction on the request body (Body) parameter in the network traffic set comprises:
extracting, for each network traffic in the network traffic set, features of the Body parameter of the network traffic in a plurality of character-related dimensions;
obtaining, based on the features of Body parameters of the network traffic comprised in the network traffic set in the plurality of character-related dimensions, the Body parameter feature set corresponding to the network traffic set.

15. The electronic device according to claim 8, wherein the determining whether the network traffic is the abnormal access network traffic based on the extracted feature vector, as well as the URL feature set indicated in the target traffic identification model and the confidence interval of the Body parameter in each feature dimension, comprises:
determining whether the URL feature of the network traffic belongs to the URL feature set and whether the parameter feature of the Body parameter in each feature dimension belongs to the confidence interval based on the URL feature of the network traffic indicated by the feature vector and the parameter features of the Body parameter of the network traffic in the plurality of feature dimensions;
determining an abnormal probability corresponding to the network traffic according to a determination result and weight values respectively corresponding to the URL feature and each feature dimension of and the Body parameter;
determining that the network traffic is the abnormal access network traffic in a case where the abnormal probability is greater than a set threshold, otherwise determining that the network traffic is a normal access network traffic.

16. The computer-readable storage medium according to claim 9, wherein the network state information comprises Internet Protocol (IP) five-tuple information; the searching, according to the network state information, the target business container associated with the network traffic, and invoking the target traffic identification model corresponding to the target business container from the pre-trained traffic identification model set, comprises:
determining a target business container group associated with the network traffic according to a source IP address and a destination IP address in the IP five-tuple information, wherein the target business container group comprises a source container matched with the source IP address and a destination container matched with the destination IP address;
obtaining the target traffic identification model corresponding to the target business container group from the pre-trained traffic identification model set.

17. The computer-readable storage medium according to claim 9, wherein traffic identification models in the traffic identification model set are trained according to the following steps:
performing, according to business information corresponding to the obtained network traffic and business information of one or a plurality of business containers, an aggregation process on the obtained network traffic to obtain a network traffic set corresponding to a business container group, wherein business information of business containers comprised in each business container group is the same;
performing feature extraction of a plurality of feature dimensions on the network traffic set to obtain a feature matrix corresponding to the network traffic set, wherein the feature matrix is formed of feature vectors corresponding to network traffic comprised in the network traffic set;
calculating, based on the feature matrix, to obtain a traffic identification model corresponding to the business container group, wherein the traffic identification model is used to characterize an aggregation feature corresponding to normal access network traffic.

18. The computer-readable storage medium according to claim 9, wherein after the target traffic identification model corresponding to the target traffic container is determined, the method further comprises:

obtaining network traffic generated within a preset time period;

re-executing, based on the network traffic generated within the preset time period, a training process of the target traffic identification model, to update the target traffic identification model.

\* \* \* \* \*